May 19, 1942.   J. D. SOEHNER   2,283,826
ELECTRIC WELDING MECHANISM
Filed June 3, 1939

INVENTOR
JOHN D. SOEHNER
George T. Gill
ATTORNEY

Patented May 19, 1942

2,283,826

UNITED STATES PATENT OFFICE 2,283,826

ELECTRIC WELDING MECHANISM

John D. Soehner, Valley Stream, N. Y., assignor to Metropolitan Device Corporation, Brooklyn, N. Y., a corporation of New York Application June 3, 1939, Serial No. 277,131

5 Claims. (Cl. 121—38)

The invention herein disclosed relates to a mechanism having two or more relatively moving parts that in the operation of the machine move relatively and then remain stationary during a particular operation. More particularly, the invention relates to such a mechanism coupled with controls therefor, to insure the maintenance of the relation of the elements during the time interval necessary to effect the operation. Such a mechanism, by way of example, is a spot welding machine for spot welding two metal parts together. In such a machine the two parts to be welded are placed between spaced electrodes which are brought together and clamp the parts to be welded. As the electrodes engage the parts an electrical circuit, of which the electrodes and the metal parts therebetween form conductors, is completed. Current flows through the parts and effects a heating at the spot clamped between the electrodes, through which heating the weld is effected. To secure a good weld the parts must be heated sufficiently and in consequence the electrodes must remain in clamping position during a definite time interval.

While arrangements have heretofore been provided for cutting off the current in a spot welding machine, for example, after the lapse of time necessary to effect a proper spot weld, the efficacy of such arrangements have been lessened and rendered practically ineffective by the operators. In operating such machines the operators release the electrodes before the required time interval has elapsed and thus despite the timing of the duration of the passage of current through the parts to be welded, poor welds are obtained due to the desire of the operator to operate the machine as rapidly as possible.

By this invention there is provided an arrangement of mechanism in which once the two relatively movable parts are brought into operative relation they must remain in this relation for a definite period of time. The time interval may be varied to suit the particular conditions of the particular mechanism. Thus, for example, in the case of a spot welding mechanism, the time interval is adjusted so that the electrodes remain in the circuit closing position until the time elapsed for the breaking of the circuit occurs. In this way the circuit is opened by the proper circuit breaking equipment and not by the separation of the electrodes. Arcing and the burning of the electrodes, as well as poor welds are thus avoided.

For the purpose of more fully describing the invention a spot welder embodying the invention has been illustrated, by way of example, in the accompanying drawing in which.

Figures 1, 2, 3:
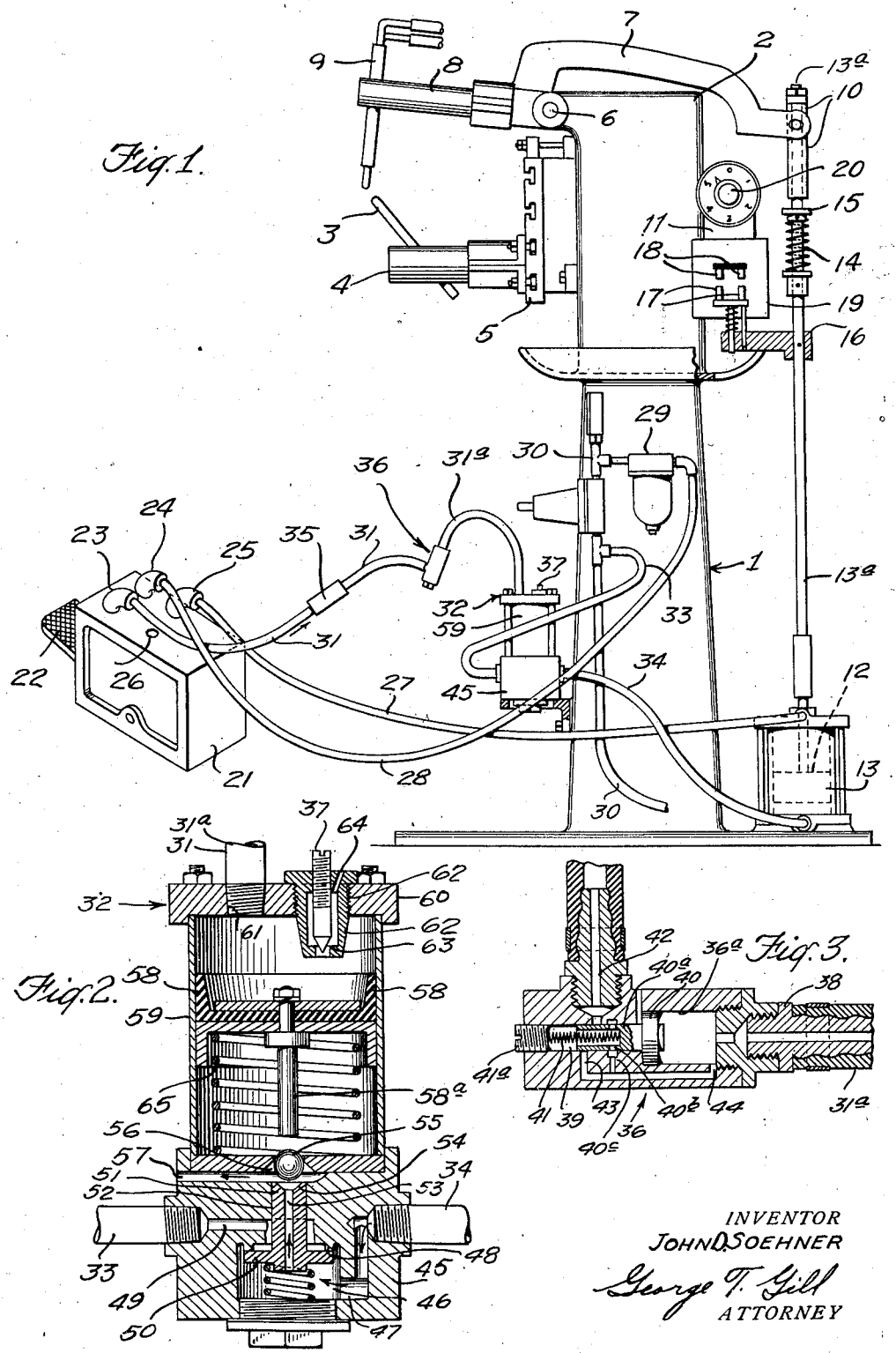
Fig. 1 is an elevation of the spot welder embodying the invention.
Fig. 2 is a sectional elevation of pneumatically actuated three-way valve.
Fig. 3 is a longitudinal section of a special valve.

The spot welder illustrated in the drawing includes a base 1 on which a welding head 2 is mounted. The welding head carries a stationary electrode 3 that is mounted in a bracket 4 extending from a plate 5 secured to the side of the welding head. The bracket 4 is adjustable vertically and horizontally in the plate 5 and the electrode 3 is removable so that it may be replaced from time to time as is customary with such welding equipment. To the head 2 at the point 6 there is pivoted a bracket 7 shaped as shown. This bracket 7 carries an electrode holder 8 in which an electrode 9 is mounted. The bracket 7 extends to the rear of the head and is bifurcated to receive the end of a rod 10 that is pivotally secured thereto. In spot welding two plates together, the plates are placed between the electrodes 3 and 9 and the bracket 7 is moved to bring the electrode 9 into position to clamp the plates between the electrodes. When the electrodes 3 and 9 engage the plates in clamping relation an electrical circuit is completed of which the electrodes 3 and 9 and the plates therebetween form a part. The higher resistance of the plates to the flow of current causes a rapid heating of the plates as a high current is caused to flow in the circuit. By this heating the welding of the two plates at the spot between the electrodes is effected. The duration of time of the flow of current is controlled by an electric timing device 11 mounted on the rear of the head 2. This is adjustable to suit different sized plates and different conditions. All of the foregoing are common and well known in the art of spot welding machines.

The arm 7 is actuated pneumatically through a piston 12 operating in a cylinder 13. To the piston 12 there is secured a piston rod 13a which has a resilient engagement through a spring connection 14 and collar 15 with the rod 10. As the piston 12 is raised in the cylinder, it actuates the lever 7, through the resilient connection 14, to move the electrode 9 towards the electrode 3 and to clamp two pieces of metal placed between the electrodes. A bracket 16 secured to the connecting rod 13a actuates a switch on the upward movement of the connecting rod. The switch consists of a pair of blades 17 mounted on the bracket 16 and positioned to engagement blade receiving contacts 18 mounted upon the side of a transformer 19 upon which the timing device 11 is mounted. Upon the closing of this switch the primary of the transformer is energized from a source of current (not shown). The secondary of the transformer is connected in series with the electrodes 3 and 9. After the lapse of a definite interval of time which is sufficient to effect a weld for the particular size of plates placed between the electrodes, the electric circuit to the electrodes is broken by the timing device 11. As is usual with such timing devices there is provided an adjusting element 20 by means of which the time period during which the circuit remains closed may be varied.

The operation of the piston 12 in the cylinder 13 is controlled through a valve 21. This valve has a pedal 22 through which the valve is operated. The pedal is normally maintained in the upward position and to effect the operation of the machine, the operator presses the pedal downwardly. The valve has four ports 23, 24, 25, and 26. The port 26 is open to the atmosphere and constitutes the exhaust port. The port 25 is connected through a flexible hose connection 27 to the top of the cylinder 13. The port 24 is connected through a flexible hose 28 to one side of a reducing valve 29 that is connected to the high pressure air supply conduit 30. The port 23 is connected through a flexible hose 31 to a pneumatically operated three-way valve 32. The valve 32 controls admission of high pressure air to, and the exhaust of air from the bottom of the cylinder 13. For this purpose, one side of the valve is connected by a flexible hose 33 to the high pressure air supply 30. The other side of the valve is connected through a flexible hose 34 to the lower end of the cylinder.

In operation when the pedal 22 is in the raised position the port 25 is connected to the port 24 so that low presure air is supplied to the upper portion of the cylinder 13. The port 23 is connected to the exhaust port 26 and thus the flexible hose 31 through which air is supplied to the pneumatically operated valve 32 is connected to the exhaust. When the ports 23 and 26 are connected together the three-way valve 32 is so positioned that the lower portion of the cylinder 13 is connected to the exhaust. When the pedal is pressed down the port 25 and in consequence the upper portion of the cylinder 13 is connected to the exhaust port 26. The port 24 is connected to the port 23 so that air under low pressure is delivered to the port 23 and through the hose 31 is supplied to the pneumatically operated valve. Upon operation of the pneumatically operated valve, the hose 33 is connected to the hose 34 and thus high pressure is admitted to the lower portion of the cylinder 13 and effects the movement of the bracket 7 and the electrode 9 towards the electrode 3. When the pedal 22 is released and the conditions above described maintain, the upper portion of the cylinder 13 being connected to pressure and the lower portion being connected to exhaust, the piston 12 is moved toward the bottom of the cylinder and separates the electrodes 3 and 9.

Within the hose 31 there is mounted a screen 35 to prevent the passage of any dust particles. Also mounted within this hose 31 is a fixture 36 which is illustrated in detail in Fig. 3. This fixture is such that it allows the passage through the hose 31 only the quantity of air sufficient to effect the actuation of the valve 32. When this amount of air has passed through the hose 31 the fixture 36 cuts off further passage of air until the air pressure in the valve 32 is reduced to a very low value. The time required for the reduction of the air pressure in the valve 32 is determined by the setting of a needle valve 37 through which air is exhausted from the pneumatic chamber of the valve 32.

As shown in Fig. 3 the fixture 36 includes a case in which there is a cylindrical cavity 36a. One end of this cavity is connected through a connector 38 to the section 31a of the hose 31. A passage 39 also forming a cylindrical cavity communicates with the cylinder 36a. Within the cylinder 36a there is a piston 40 on the end of which there is formed a reduced extension 40a that extends into the cavity 39. A spring 41, the compression of which may be adjusted by a set screw 41a, abuts against the end of extension 40a. Two air passages 42 and 43, axially spaced, communicate with the cavity 39. The air passage 43 also communicates with the cylinder 36a. In the cut off position of the piston 40, the extension 40a covers the air passage or port 42 and opens the lower end of the cavity 39 to the atmosphere through ports 40b in the extension 40a and a passage 40c. This is the condition that maintains when sufficient air has passed through the fixture to actuate the valve 32. In this condition, no air can pass from the port 42 to the port 43. When the air pressure in the valve 32 has been reduced to a relatively low value the spring 41 which is calibrated to suit the conditions, moves the piston 40 towards the right end of the cylinder as viewed in Fig. 3. This movement is insufficient to cover the port 44 through which the passage 43 communicates with the cylinder 36a. It is, however, sufficient to permit communication between the ports 42 and 43 through the cavity 39.

In operation, when the pedal 22 is pressed downwardly to place the ports 23 and 24 into communication, air flows through the line 31, the screen 35, the port 42 in the fixture 36, the cavity 39, the port 43, port 44, the passage through the connector 38 and section 31a of line 31 to the valve 32. The air continues to flow into the valve 32 until the valve is actuated and the pressure therein is sufficient, acting upon the enlarged face of the piston 40 to overcome the force of the pressure acting upon the smaller face of the piston extension 40a and the force of the spring 41. When this condition exists, the piston 40 moves to the closed position, the position illustrated in Fig. 3. The piston will remain, even though the operator releases the pedal 22, in this cut off position until the pressure in the valve 32, as determined by the needle valve 37, is sufficiently reduced so that the force of the spring 41 acting alone is sufficient to move the piston 40 to the open position. Thus, it will be seen that the pressure of the valve has to build up sufficiently to overcome two forces before the piston 40 moves to the cut off position. It must be sufficient to overcome the force exerted by the pressure of the air on the end of the piston extension 40a and the force exerted by the spring 41. Before the piston 40 can move to the open position the pressure has to be reduced in the valve 32 to a point where only one of the two forces is sufficient to move the piston 40, namely the force of the spring 41.

Thus the valve 32 will remain actuated to connect the high pressure air to the lower end of the cylinder until enough air passes through the needle valve 37 to reduce the pressure. The time this condition maintains may be fixed by adjusting the needle valve. It will be also noted that no movement of the piston 12 can occur as long as the high pressure air is being admitted to the bottom of the cylinder 13 even though the pedal 22 is moved to the raised position and low pressure air is admitted to the upper portion of the cylinder. The high pressure air on the lower surface of the piston is sufficient to overcome the effect of the low pressure on the upper face of the piston and in addition the high pressure air acts upon a greater area of piston surface because the upper surface of the piston 12 on which the low pressure air acts is reduced in area to the extent of the area of the connecting rod 13. When sufficient air has escaped through the valve 37 so that the valve 32 is actuated to disconnect the lower portion of the cylinder 13 from the high pressure air supply and to connect it to the exhaust, the low pressure air acting upon the top of the piston will effect a downward movement of the piston.

A suitable three-way valve for performing the functions of the valve 32 is illustrated in Fig. 2. This valve consists of a base 45 having a valve recess 46 with which the hose 34 communicates through a port 47. In the valve recess 46 there is formed a valve seat 48 and a port 49 communicates with the valve recess on the side of the valve seat opposite to that to which the port 47 is connected. The port 49 is connected to the hose 33. Within the valve recess 46, there is a valve 50 having a valve stem 51 which extends through a bore 52. The valve 50 engages the valve seat to cut off communication between the hose 22 and the hose 34. Bored longitudinally of the valve stem, there is a passage 53 which terminates in a conical valve seat 54 with which a ball valve 55 cooperates. The ball 55 is received in a chamber 56 that communicates with a passage 57 that is open to the atmosphere. The upper part of the valve chamber 56 is opened to receive a piston rod 58a secured on a piston 58 mounted in a cylinder 59. The cylinder 59 is mounted on the base 45 and one end of the cylinder is closed by the base 45. The other end of the cylinder 59 is closed by a cap 60 having a port 61 to which the hose 31 is connected. The needle valve 37 is threaded into an opening in the cap 60.

This valve 37 consists of a case 62 externally threaded to be received in the opening in the cap 60 and bored longitudinally. Within the case there is a valve seat 63 that cooperates with the needle valve 37 which is threaded into the case and extends above the case 62. A passage 64 is provided through the valve case 62 to the atmosphere. It will be apparent, as is the case with needle valves of this type, that by adjusting the valve 37 with respect to the seat 36 the flow of air from the cylinder 59 can be controlled.

In the operation of the valve, air is admitted, in the manner explained above, through the hose 31, to the cylinder 59. This air acts upon the piston 58 which moves downward in the cylinder as seen in Fig. 2. On downward movement of the piston the end of the piston rod 58a engages the ball 55 and presses the ball against the valve seat 54 to close communication between the passage 53 and the passage 57. Further movement of the piston 58 moves the valve 50 away from the valve seat 48 and opens communication between the passage 49 and the passage 47. The high pressure air is thus admitted to the lower portion of the cylinder 13. The piston 58 acts against a spring 65 arranged in the cylinder and abutting at one end against the piston and at the other against the block 45. When sufficient air has passed through the valve 37 so that the spring can overcome the force exerted by the air acting on the piston 58, the piston is moved upwardly, to the position shown in Fig. 2. When this occurs, air from the lower portion of the cylinder 13 lifts the ball 55 from its seat and thus passes through the passages 53 and 57. The lower portion of the cylinder 13 is thus connected to the atmosphere and the piston is free to move downwardly under the force of the low pressure air entering the upper part of the cylinder.

From the foregoing it will be seen that the time during which the electrodes are maintained in clamping relation is independent of the operator. Once the operator presses the pedal and the valve 32 is actuated, the operator may release the pedal but this will not effect the clamping action of the electrodes. The electrodes will be separated after sufficient air passes through the needle valve 37 to permit the upward movement of the piston 58 under the action of the spring 55. The valve 37, in the case of a spot welding machine, such as that illustrated by way of an example of the application of the invention, will be set so that the time during which the electrodes are maintained in clamping relation will just exceed the time period of the current flow as determined by the timing device 11.

It will be obvious that various changes may be made by those skilled in the art in the details of the embodiment of the invention described above within the principle and scope of the invention as expressed in the appended claims.

I claim:

1. In a machine of the kind described, the combination comprising two elements relatively movable between inoperative and operative positions, pneumatically operative means for effecting relative movement of the elements, and control means therefor including a valve for controlling the flow of fluid thereto, manually operative control means for controlling the operation of said valve, cut-out means automatically operative on operation of said valve in a direction to effect movement of the elements to operative position, said cut-out means upon operation rendering said manually operative control means ineffective for affecting said valve, and means for maintaining said cut-out means operative during a definite time interval.

2. In a machine of the kind described, the combination comprising two elements relatively movable between inoperative and operative positions, pneumatically actuated means for effecting relative movement of the elements, and control means therefor including a valve for controlling the flow of fluid thereto, manually operative control means for controlling the operation of said valve, cut-out means intermediate said manually operative control means and said valve automatically operative on operation of said valve in a direction to effect movement of the elements to operative position, said cut-out means upon operation rendering said manually operative control means ineffective for affecting said valve, and means for maintaining said cut-out means operative during a definite time interval.

3. In a machine of the kind described, the combination comprising two elements relatively movable between inoperative and operative positions, pneumatically actuated means for effecting relative movement of the elements, and control means therefor including a pneumatically actuated valve for controlling the flow of fluid thereto, a manually operative valve for controlling said pneumatically actuated valve, cut-out means intermediate said manually actuated valve and said pneumatically actuated valve automaticlly operative on operation of the pneumatically actuated valve in a direction to effect relative movement of the elements to operative position, said cut-out means upon operation rendering said manually operative valve ineffective for affecting said pneumatically operated valve, and means for maintaining said cut-out means operative during a definite time interval.

4. In a machine of the kind described, the combination comprising two elements relatively movable between inoperative and operative positions, pneumatically actuated means for effecting relative movement of the elements, and control means therefor including a pneumatically actuated valve for controlling the flow of fluid thereto, a manually operative valve for controlling the operation of said pneumatically actuated valve, pneumatically actuated out-out means intermediate said manually operative valve and said pneumatically operative valve automatically operative on operation of the pneumatically actuated valve in a direction to effect relative movement of the elements to operative position, said cut-out means upon operation rendering said manually operative valve ineffective for affecting said pneumatically operated valve, and means for maintaining said cut-out means effective during a definite time interval.

5. In a machine of the kind described, the combination comprising two elements relatively movable between inoperative and operative positions, pneumatically actuated means for effecting relative movement of the elements, and control means therefor including a pneumatically actuated valve for controlling the flow of fluid thereto, a manually operative valve for controlling the operation of said pneumatically actuated valve, pressure actuated pneumatic cut-out means intermediate said manually operative valve and said pneumatically actuated valve automatically operative on operation of the pneumatically actuated valve in a direction to effect relative movement of the elements to operative position, said cut-out means upon operation rendering said manually operative valve ineffective for affecting said pneumatically operated valve, and means for maintaining said cut-out means operative during a definite time interval.

JOHN D. SOEHNER.